United States Patent
Maltz

(10) Patent No.: US 7,411,696 B2
(45) Date of Patent: Aug. 12, 2008

(54) SMOOTH GRAY COMPONENT REPLACEMENT STRATEGY THAT UTILIZES THE FULL DEVICE GAMUT

(75) Inventor: Martin S. Maltz, Brighton, NY (US)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 10/342,355

(22) Filed: Jan. 15, 2003

(65) Prior Publication Data

US 2004/0136014 A1    Jul. 15, 2004

(51) Int. Cl.
G06K 15/00 (2006.01)
G06K 9/40 (2006.01)
H04N 1/46 (2006.01)

(52) U.S. Cl. ............... 358/1.9; 358/2.1; 358/525; 382/162; 382/167; 382/264; 345/590

(58) Field of Classification Search .......... 358/1.9, 358/2.1, 525; 345/590; 382/264, 162, 167
See application file for complete search history.

(56) References Cited

U.S. PATENT DOCUMENTS

| | | | |
|---|---|---|---|
| 4,275,413 A | 6/1981 | Sakamoto et al. | |
| 4,500,919 A | 2/1985 | Schreiber | |
| 5,243,414 A | 9/1993 | Dalrymple et al. | |
| 5,305,119 A | 4/1994 | Rolleston et al. | |
| 5,317,426 A | 5/1994 | Hoshino | |
| 5,592,311 A | 1/1997 | Hibi | |
| 5,710,824 A | 1/1998 | Mongeon | |
| 7,019,868 B2 * | 3/2006 | Chang et al. | 358/2.1 |

OTHER PUBLICATIONS

Littlewood et al., "Pareto-Optimal Formulations for Cost Versus colorimetric Accuracy Trade-Offs in Printer Color Management," Apr. 2002, pp. 132-175, vol. 21, No. 2, ACM Transactions on Graphics.

Kang et al., "Methods of Colour Gamut Extension Algorithm Development Using Experimental Data," Sep. 15, 1999, pp. 352-355, vol. 1, Tencon 99. Proceedings of the IEEE Region 10 Conference Cheju Island, South Korean.

Nin et al., "Printig CIELAB Images On a CMYK Printer Using Tri-Linear Interpolation," Feb. 11, 1992, pp. 316-324, vol. 1670, Proceedings of the SPIE.

* cited by examiner

Primary Examiner—David K Moore
Assistant Examiner—Thomas J Lett
(74) Attorney, Agent, or Firm—Oliff & Berridge, PLC.

(57) ABSTRACT

Systems and methods are disclosed of a smooth gray component replacement strategy which utilizes the full gamut of a printer device. A CMY to CMYK gray component replacement transform is disclosed which inherently exploits the full gamut of the printer, by transforming points in CMY cube to L*a*b* color space, scaling the obtained values so they fill the maximum gamut obtainable with the printer device and calculating the CMYK values needed to obtain the scaled L*a*b* values. The CMY to CMYK transform is then smoothed with an averaging filter that does not change CMYK values at the corners. The entire color gamut is adequately sampled and small changes in CMY do not produce large jumps in L*a*b*.

10 Claims, 6 Drawing Sheets

SMOOTH GRAY COMPONENT REPLACEMENT STRATEGY THAT UTILIZES THE FULL DEVICE GAMUT

BACKGROUND OF THE INVENTION

1. Field of Invention

The invention relates generally to systems and methods to improve and extend the color gamut of a printer.

2. Description of Related Art

Printers generally have an output which can be defined as existing in a color space called CMYK, referring to the cyan, magenta, yellow, and black colorants, which is uniquely defined for the printer by its capabilities and colorants. The printer receives information in a first color space, which may have values defined in an independent color space that is not used by any device, and converts that information to print in a second color space that is dependent of device characteristics.

There are many methods for converting between color spaces, all of which begin with the measurement of the printer response to certain input values. Commonly, a printer is driven with a set of color input values, the values are printed during normal operation of the printer, and measurements are made of the printed colors to determine what the actual color was printed in response to the color specification. Most printers have non-linear response characteristics.

Calibrating a printer involves finding what set of signals must be sent to a printer to obtain a desired color. The desired color is described in some device-independent terminology, such as, for example, some well-defined standard. In contrast, the signals to the printer constitute a device-dependent terminology. A complete calibration will transform the device-independent color description into a device-dependent description such that the resultant combination of materials, such as, for example, ink, toner, dye, etc., on the paper produces the desired color, i.e., the color which was initially described in a device-independent fashion.

Calibrating high quality printers can be divided into three major tasks, (1) setting a gray balance, (2) determining black addition and under-color removal, if any; and finally (3) obtaining an apparatus color correction or color transformation. A side effect from converting from CMY to CMYK is that the gamut may be reduced. That is, the number of colors that are produced may be reduced, due to loss of hue. This side effect can be compensated for by using an under-color addition process. The under-color addition process regains lost hues and expands the gamut. A gray component replacement strategy may use both under-color removal (UCR) and under-color addition (UCA or K+).

In U.S. Pat. No. 4,500,919 to Schreiber, and U.S. Pat. No. 4,275,413 to Sakamoto each incorporated herein by reference in its entirety, the information derived from sample patch measuring was placed into look-up tables, stored in a memory, perhaps ROM memory or RAM memory, where the look-up table relates input color space to output color space. The look-up table is commonly a three-dimensional table, since color space is three dimensional. With a scanner or computer, the RGB space can be defined as three-dimensional with black at the origin of a three-dimensional coordinate system (0,0,0), and white at the maximum of a three dimensional coordinate system. In an 8-bit system, the maximum would be located at a point having coordinates of (255, 255, 255). In an RGB space each of the three axes radiating from the origin point therefore respectively define the red, green, and blue components.

A similar construct can be made for the printer, with axes representing cyan, magenta, and yellow. Black is usually a separate toner which is added separately. In the 8-bit system suggested above there will be, however, over 16 million possible colors ($256^3$). There are clearly too many values for a 1:1 mapping of RGB colors to CMYK colors. Accordingly, as proposed in U.S. Pat. No. 4,275,413 to Sakamoto, only a relatively small number of samples are made at the printer, perhaps on the order of 1,000 samples, or even fewer. Therefore, the look-up tables include a set of values which could be said to be the intersections for corners of a set of rectangular parallelepipeds mounted on top of one another. Colors falling within each rectangular volume can be interpolated from the measured values, through a variety of methods, including tri-linear interpolation, tetrahedral interpolation, polynomial interpolation, linear interpolation, and any other appropriate interpolation method depending on the accuracy of the desired result.

An example of a method involved in such printers is found in U.S. Pat. No. 5,710,824, which discloses a method for printing in a color printer so that scanned color images defined in terms of calorimetric color signals may be printed on a color printer responsive to printer colorant signals to render a color print with a set of three primary colorants and black on a substrate. The method includes scanning an image to derive a set of device-independent colorimetric color signals. Then, the colorimetric color signals are converted into device-dependent primary colorant signals. Each primary colorant signal defines a density of colorant to be used in rendering a color print. The conversion accounts for a subsequent black colorant addition. Next, a black colorant signal is determined as a function of minimum and maximum values of the combination of primary colorant signals. The determined black color signal adds black colorant as a nonlinear function of the primary colorant signals to expand the printable color gamut. Then, the primary colorant signals are gray balanced and black is linear zed to generate a set of corresponding printer colorant signals to control the printer. Finally, the printer colorant signals are used to control the printer to produce an image calorimetrically matching the scanned image.

SUMMARY OF THE INVENTION

The 919, 413 and 824 patents typically transform from RGB or from CMY to CMYK by specifying the amount of CMY colorants to be replaced by black (K), and the amount of black (K) to be used, as a function of the cyan, magenta or yellow separation, that achieves a minimum amount of applied colorant (e.g., dye or toner). The 919, 413 and 824 patents thus do not exploit the total gamut of a printer device in a smooth manner.

Gray component replacement (GCR) replaces a gray component of a color with an equal amount of black color. The gray component is made up of a mixture of subtractive primary colors, such as, for example, cyan, magenta and yellow. It typically takes a combination of three subtractive primaries to produce the gray (or achromatic) component of a color. In gray component replacement (GCR), only one achromatic color, e.g., black, is used to generate a color's gray component instead of three subtractive primary colorants, e.g., cyan, magenta and yellow. As a result, the total amount of colorant used to reproduce a color is reduced. A black colorant may also be used to replace equal portions of three subtractive primaries, e.g., replacing of cyan, magenta and yellow with black in shadow tones of an image. This latter technique is referred to both as under color removal (UCR) and as gray component replacement (GCR). Conventional gray component replacement (GCR) and/or gray component replacement/under color removal (GCR/UCR) techniques do not exploit the total gamut of a printing device in a smooth manner.

The systems and methods of this invention provide a gray component replacement (GCR) strategy as a smooth transform from CMY to C'M'Y'K' which uses the entire printer gamut.

The systems and methods according to this invention exploit the total gamut of a printing device in a smooth manner by warping the points inside of a CMY cube so that they fill the entire gamut of the printing device.

Warping the points may be done in any device-independent color space. In various exemplary embodiments, the points are warped in the L*a*b* color space. Then, the CMYK values needed to obtain the scaled L*a*b* values are determined. In various exemplary embodiments, the CMY to CMYK transform is then smoothed with an averaging filter that does not change the CMYK values at the corners of the color space. The C'M'Y'K' value which corresponds to a CMY value is that value that gives the L*a*b* value obtained by warping the CMY cube. The systems and methods according to this invention are useful in any printing system, including image-on-image devices and ink jet devices, and especially in printing systems in which the addition of a colorant to black results in a color which is lighter than black alone.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

The systems and methods according to this invention employ a smooth gray component replacement strategy that uses the full device gamut. The systems and methods according to this invention are typically used as part of a printing method, where the printing method typically includes one or more of (1) scanning an image to derive a set of device-independent colorimetric color signals, (2) converting the calorimetric color signals into device-dependent primary colorant signals, where each primary colorant signal defines a density of colorant to be used in rendering a color print, such that the conversion accounts for a subsequent black colorant addition, (3) determining, for values of the combination of primary colorant signals, a black colorant signal, whether to add black colorant, as a function of the primary colorant signals, to the color print, (4) gray balancing the primary colorant signals, (5) using black to generate a set of corresponding printer colorant signals and (6) using the printer colorant signals to control the printer to produce an image that calorimetrically matches the scanned image. In various exemplary embodiments, the smooth gray component replacement process according to the systems and methods of this invention is implemented using a set of lookup tables storing the responses of a set of patches generated as a set of input values, to build a three-dimensional color calibration lookup table which is used with tetrahedral interpolation.

In various exemplary embodiments, the systems and methods according to this invention build a cyan/magenta/yellow (CMY) to a cyan/magenta/yellow/black (CMYK) gray component replacement (GCR) transform in a fashion that inherently exploits the full gamut of the device. In various exemplary embodiments, the systems and methods of this invention transform the points in the cyan/magenta/yellow cube to L*a*b* values, scale the L*a*b* values so that the L*a*b values fill the maximum gamut obtainable with a specific printer device, and then determine the CMYK values needed to obtain the scaled L*a*b* values. The CMY to CMYK transform is then smoothed with an averaging filter that does not change the CMYK values at the corner of the color gamut boundary.

In various exemplary embodiments, the systems and methods according to this invention define a gray component replacement strategy as a smooth transform from a CMY space to C'M'Y'K' space which uses the entire printer gamut. The basic approach is to warp the points inside a CMY cube so that the warped points fill the entire CMYK gamut of the printer. The warping may be done in any perceptually-uniform color space, such as, for example. CIELUV, HCV, PQV or CIEL*a*b* space. In one exemplary embodiment according to this invention, the warping is done is CIEL*a*b* space. A C'M'Y'K' value corresponding to any CMY value is the C'M'Y'K' value that gives the L*a*b* value obtained by warping the CMY cube.

Figure 1:
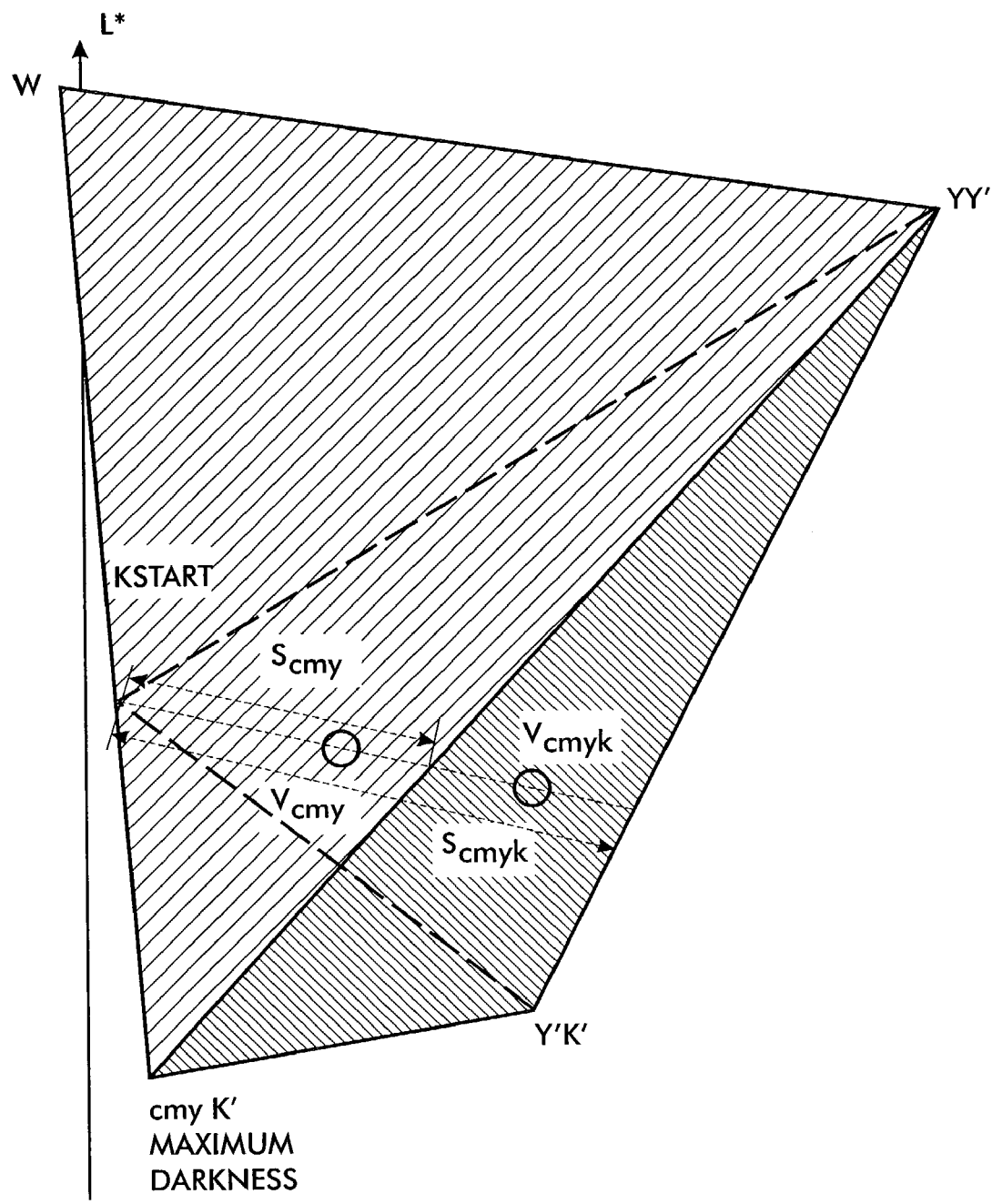
FIG. 1 is a vertical cross-section through a color solid showing an individual hue.

The warping process can be understood with reference to FIG. 1. FIG. 1 is a vertical cross section of a color cube showing a particular color hue. In this particular example, the particular color hue is the color yellow. The L*a*b* values for the printer white point, the six maximum chrome points (M, CM, C, CY, Y, and YM) and the maximum darkness point are considered to be the corners of a distorted CMY cube plotted in L*a*b* space. The yellow hue leaf of this distorted cube, that is, the plane containing the neutral axis that runs from white to maximum darkness, and the yellow point, is shown in the unshaded area of the figure.

Most printing technologies produce maximum darkness with 100% CMYK. For some printing technologies, however, such as, for example, certain image-on-image xerography technologies and some ink jet system technologies, adding cyan, magenta or yellow colorants to a black colorant makes the combined color lighter than black alone. That is, in these technologies, the maximum darkness is obtained with pure black. Although the techniques discussed in this disclosure can be used for any kind of printer, they are particularly advantageous for printers where adding cyan, magenta or yellow to black makes the combined color lighter than black alone.

Figure 2:
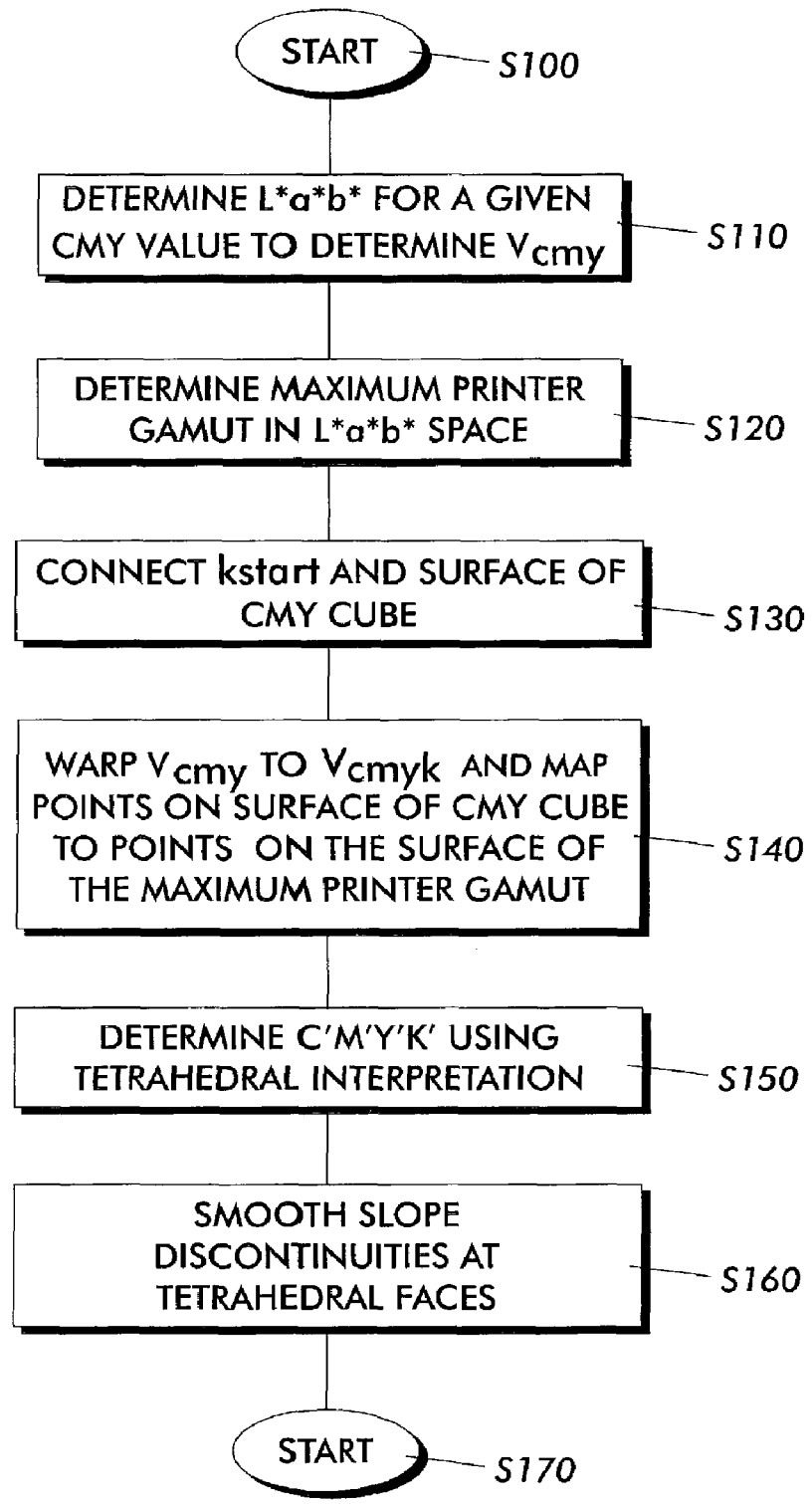
FIG. 2 is a flowchart outlining one exemplary embodiment of a method for performing smooth gray component replacement using full device gamut according to this invention.

FIG. 2 is a flowchart illustrating one exemplary embodiment of a method for gray component replacement according to this invention. As shown in FIG. 2, operation starts in step S100, and proceeds to step S110, where the L*a*b* value is determined for a given CMY value. One exemplary technique for determining the L*a*b* values is tetrahedral interpolation in the CMY cube to determine a correspondence value point, which may be designated as a $V_{cmy}$ point, as shown in FIG. 1. It should be noted that the L*a*b* value for the CMY corner of the cube is the L*a*b* of the maximum darkness point of the printer, whether it is made with a 100% CMYK technology for producing maximum darkness, or a 100% black technology for producing maximum darkness. Then, in step S120, the maximum printer gamut in L*a*b* space is determined. Next, in step S130, a line is drawn from an initial black value through a L*a*b* correspondence value point. Operation which is labeled CMY then continues to step S140.

In the exemplary embodiment shown in FIG. 1, the initial black point is represented by the point "$k_{start}$". In the embodiment shown in FIG. 1, the L*a*b* correspondence value point is labeled $V_{cmy}$. In various exemplary embodiments, the top surface of the maximum printer gamut is the same as the top surface of the CMY cube. For many printing technologies, maximum chrome for darker colors is obtained by adding black. For the yellow hue leaf shown in FIG. 1, black is added to 100% yellow, until both black and yellow are 100%. For printers which use technologies where adding cyan, magenta and yellow to black makes the print lighter, so that maximum darkness is obtained with pure black, the chrome of this point is quite high, such as, for example around 30. Darker colors are obtained by decreasing yellow to 0 until the maximum darkness point (C'M'Y'=0%, K'=100%) is reached. To construct the maximum printer gamut, additional L*a*b* data is determined for the six dark points of maximum chrome, that is, the points labeled MK, CMK, CK, CYK, YK, and YMK.

With respect to step S130, this initial black point is a point chosen along the neutral (achromatic) color axis. It can be called "$k_{start}$" because the CMY values on the white side of this point produce C'M'Y'K' output that uses little or no black for reasons which will be explained below. This line, which is drawn from the initial black point to the a surface of the CMY cube through the correspondence point $V_{cmy}$, intersects the surface of the CMY cube a distance of $S_{cmy}$ from the initial block point $k_{start}$, and the maximum printer gamut at a distance of $S_{cmyk}$ from the initial block point $k_{start}$. The initial block point line connects $k_{start}$ and the surface of the CMY cube.

In step S140, the L*a*b* correspondence point, i.e., the $V_{cmy}$ point, is warped to a corresponding point L*a*b* point, $V_{cmyk}$, in the maximum printer gamut three-dimensional L*a*b* color space, where:

$$V_{cmyk} = \overline{k}_{start} + (\overline{V}_{cmy} - \overline{k}_{start}) * S_{cmyk}/S_{cmy}. \tag{1}$$

Moreover, in step S140, all of the points on the surface of the CMY cube are inherently mapped to points on the surface of the maximum printer gamut in CMYK color space, points on the neutral (achromatic) color axis remain unchanged, and points in between the surface of the maximum printer gamut and the neutral axis are mapped to points in between. Next, in step S150, the C'M'Y'K' value is found from $V_{cmyk}$ by tetrahedral interpolation. Then, in step S160 the slope discontinuities are smoothed. Operation then continues to step S170, where operation of the method ends.

Figure 3:
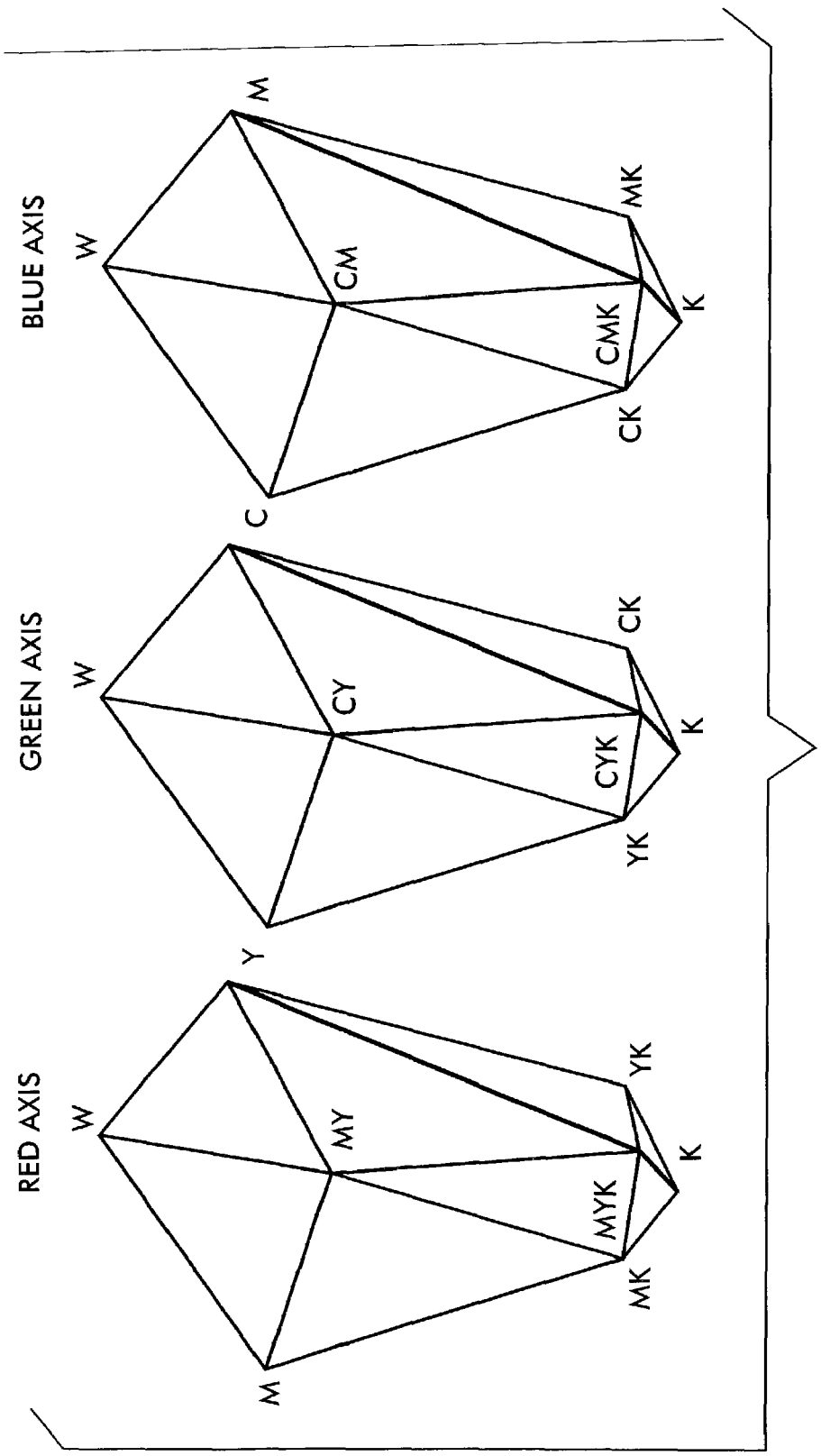
FIG. 3 shows views of printer gamut surfaces along three different hue axes.

In various exemplary embodiments, in step S150, the maximum printer gamut is split into a number of tetrahedral, such as, for example, 24 tetrahedral. Each tetrahedron has one vertex at the initial black value, and three other vertices on the surface of the maximum printer gamut, that is, the initial black value, and at Y', K'Y', and K'Y'C'. Six of the surface triangles are formed at the top of the gamut, such as for example between white and all of the subtractive primary and additive primary color gamut points, i.e., for primary colors cyan, magenta, yellow, red, green and blue (CMYRGB). Six surface triangles are formed at the bottom, between black (K) and CMYRGB+K color gamut points, and 12 surface triangles are formed around the middle of the gamut, between the CMYRGB color gamut points and the CMYRGB+K color gamut points. FIG. 3 illustrates these features, showing views of color gamut surface. With each tetrahedron, C'M'Y'K' value points are determined by linear interpolation between the CMYK' value points at the four vertices. This establishes a piece-wise linear relationship that can be used to find CMYK' color gamut points from L*a*b* color gamut points. A detailed discussions of the mechanics of tetrahedral interpolation for color correction is provided by U.S. Pat. Nos. 4,275,413 and 5,581,376, each incorporated herein by reference in its entirety.

At the initial black point, the C'M'Y' value equals the CMY, and the modified black value K' is zero. All the tetrahedral that involve the initial black point, $k_{start}$, and points on the top surface of the gamut, therefore, use no black. As the CMY values go from the initial black point, $k_{start}$, to 100% CMY, the modified black value goes from 0% to 100%, while for the case where adding CMY to black makes the color lighter, the modified black value for the modified C'M'Y'K' values goes to 0%, which is the value of C'M'Y'K' at the maximum darkness point.

Piece-wise linear approximation produces slope discontinuities at the faces of the tetrahedron. In various exemplary embodiments, in step S160, C'M'Y'K' values are first determined for a rectangular grid of CMY values. Applicants have found that using, for example, 17 evenly spaced values for each coordinate, works well. In various exemplary embodiments in step S170, the points on the edges of the CMY cube are first smoothed by:

$$C'_k[i+1] = (1-W)*C'_k[i] + W*(C'_{k+1}[i] + C'_{k-1}[i])/2 \tag{2}$$

where C' is the uniform color space cyan color, i is the iteration index, k is the index of a point on the edge, and W is the weight. Using 60 iterations with a weight of 0.3 has been found to work well. Similar equations are applied to the uniform color space colors M', Y', and K'. The values of C'M'Y'K' at the ends of the edges, that is, the vertices of the CMY cube, are not changed.

In various exemplary embodiments, in step S160, the point on the faces of the cubes are smoothed using the following equation:

$$C'_{k,m}[i+1] = (1-W)*C'_{k,m}[i] + \\ W*(C'_{k+1,m}[i] + C'_{k-1,m}[i] + C'_{k,m+1}[i] + C'_{k,m-1}[i])/4, \tag{3}$$

where:
C' is the uniform color space cyan color; and
k and m, are the coordinate indices of the points on the faces.

The values of C'M'Y'K' on the edges of the faces are unchanged.

In various exemplary embodiments, in step S160, the points in the interior of the cube are smoothed using the following equation:

$$C'_{k,m,n}[i+1] = \qquad (4)$$
$$(1-W) * C'_{k,m,n}[i] + W * (C'_{k+1,m,n}[i] + C'_{k-1,m,n}[i] + C'_{k,m+1,n}[i] +$$
$$C'_{k,m-1,n}[i] + C'_{k,m,n+1}[i] + C'_{k,m,n-1}[i])/6,$$

where:

C' is the uniform color space cyan color i and k, m, and n are the coordinate indices of the points in the cube.

The values of CMYK' on the faces of the cube remain unchanged.

Figure 4:
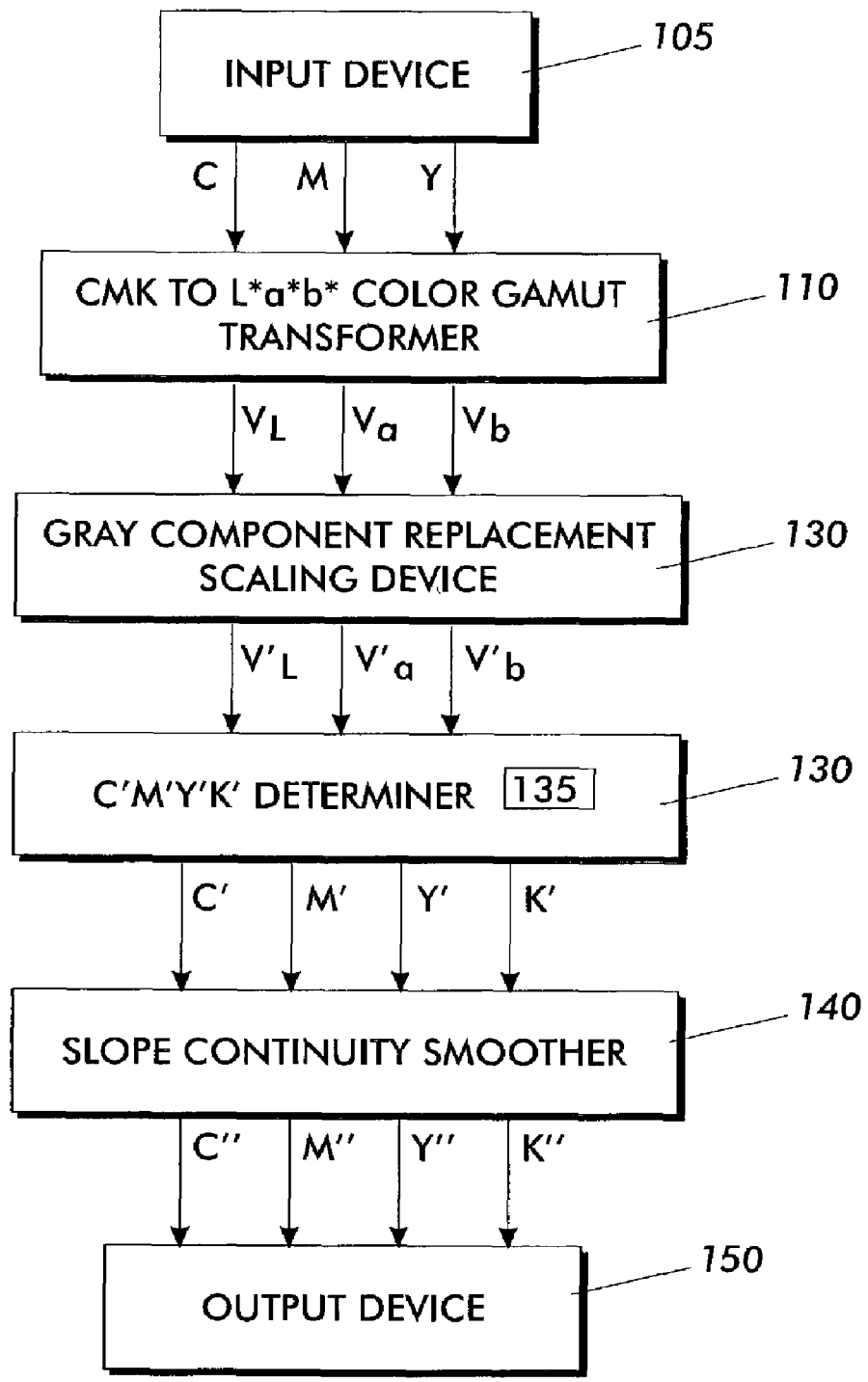
FIG. 4 is a block diagram outlining one exemplary embodiment of a system for achieving a smooth gray component replacement strategy using full device gamut according to the invention.

FIG. 4 is a block diagram outlining one exemplary embodiment of a system 100 that provides smooth gray component replacement for a printer device's full gamut. As shown in FIG. 4, a scanner or other input device 105 senses C, M and Y values for a particular image. A transforming device 110 converts the sensed CMY values to sensed L*a*b* values ($V_C$, $V_M$ and $V_Y$). A gray component replacement scaling device 120 scales and/or warps the L*, a* and b* values to generate L*a*b* maximum printer color gamut values $V'_C$, $V'_M$ and $V'_Y$ and $V'_k$. The maximum L*a*b*-scaled $V'_C$, $V'_M$ and $V'_Y$ and $V'_k$ values are warped versions of $V_C$, $V_M$ and $V_Y$ values in the maximum printer gamut. A C'M'Y'K' determiner 130, which may include a tetrahedral interpolation circuit 145, outputs modified C'M'Y' and K' values and sends the modified C'M'Y' and K' values to a slope continuity smoother/averaging filter 150, if desired. The slope continuity smoother/averaging filter 150 outputs smoothed modified C"M"Y" and K" values. These smoothed modified values are sent to a utilization device such as, for example, a marking device/printer 160 that uses these values to create a printed image on a substrate.

Figure 5:
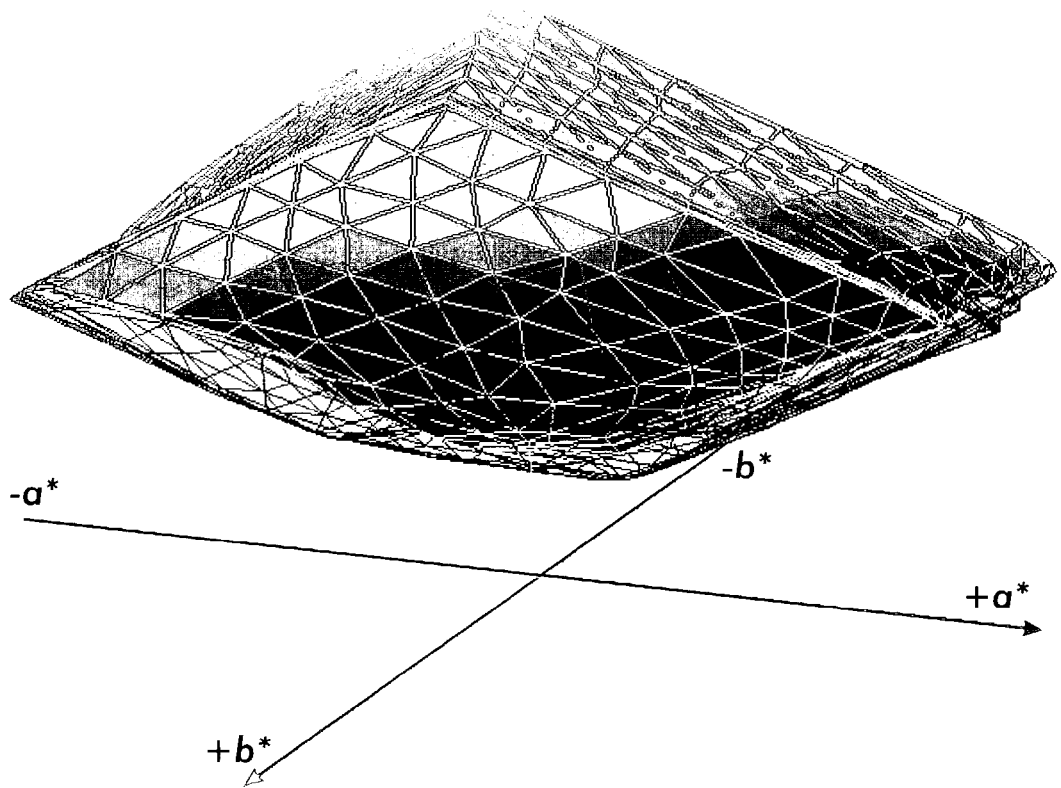
FIG. 5 illustrates one exemplary embodiment of a wireframe depiction of a printer gamut obtained using conventional gray component replacement (GCR) techniques.
Figure 6:
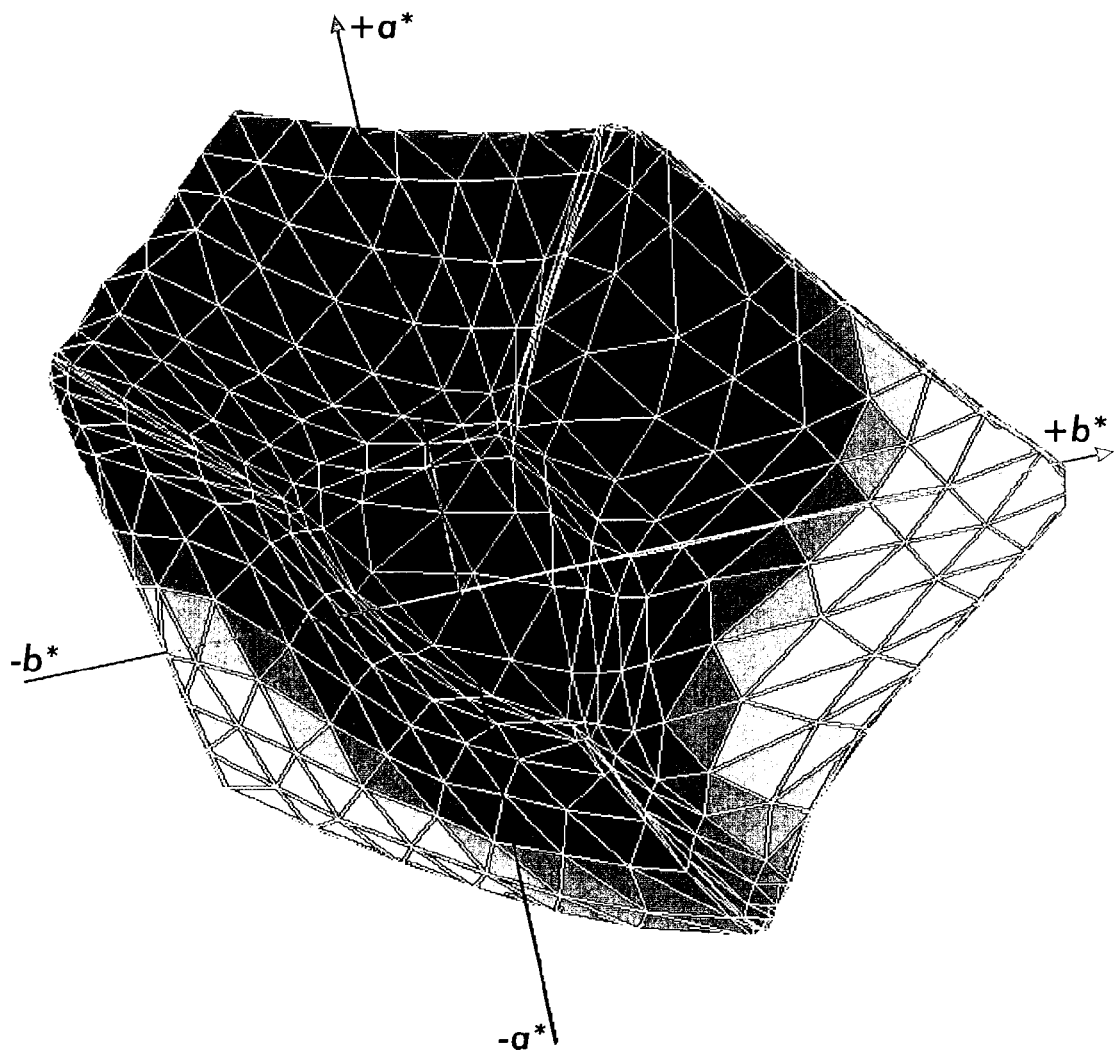
FIG. 6 illustrates one exemplary embodiment of a wireframe depiction of a printer gamut obtained using various exemplary embodiments of the systems and methods according to this invention.

FIG. 5 shows the printer gamut obtained by putting a rectangular grid of CMY values through the gray component replacement, ink limit, and toner reproduction curves of a conventional printer, printing the resulting CMYK patches, and plotting the measured L*a*b* values. The lines connect the nodes of the original CMY grid. FIG. 5 shows the gamut produced using a conventional gray component replacement strategy. In contrast, FIG. 6 shows the gamut produced using various exemplary embodiments of the systems and methods described in this application. FIG. 6 shows the bottom view of the gamut used producing various exemplary embodiments of the systems and methods according to this invention. The entire gamut shown in FIG. 6 appears to be adequately sampled, and small changes in CMY do not produce large jumps in the L*a*b* values. The wire frame gamut shown in FIG. 6 is considerably larger than the wire frame gamut shown in FIG. 5, especially in the green area.

While this invention has been described in conjunction with the exemplary embodiments set forth above, it is evident that many alternatives, modifications and variations will be apparent to one of ordinary skill in the art. Accordingly, the exemplary embodiments of the invention set forth above are intended to be illustrative and not limiting. Various changes may be made without departing from the spirit and scope of the invention.

What is claimed is:

1. A method of gray component replacement usable to obtain an expanded color gamut for a color reproduction device, comprising:

transforming colorant values in a color reproduction device colorant space to color values in a color independent color space;

scaling the values in the color independent color space to fill the maximum gamut obtainable with the colorant values in the device colorant space; and determining the colorant space values which correspond to the scaled values in the color independent space, wherein the colorant space values which correspond to the scaled values in the color independent space are usable to control a printing device to produce an image.

2. The method of claim 1, further comprising smoothing the determined colorant space values.

3. The method of claim 2, wherein smoothing the colorant space values is done without changing values at the boundaries of the colorant space.

4. The method of claim 1, wherein determining the colorant space values comprises determining the colorant space values using tetrahedral interpolation.

5. The method of claim 4, further comprising smoothing discontinuities resulting from the tetrahedral interpolation on at least one tetrahedral face.

6. A gray component replacement device usable to obtain an expanded color gamut for a color reproduction device, comprising:

a first transformer that transforms colorant values in a color-reproduction device colorant space to color values in a color-independent color space;

a warper that scales the values in the color-independent color space to fill a maximum gamut obtainable with the colorant values in the device-colorant space; and a second transformer that determines the colorant space values which correspond to the scaled values in the color-independent color space; wherein the colorant space values which correspond to the scaled values in the color independent space are usable to control a printing device to produce an image.

7. The device of claim 6, further comprising a smoother that smoothes the determined colorant space values.

8. The device of claim 7, wherein the smoother smoothes the colorant space values without changing the colorant space values at the boundaries of the colorant space.

9. The device of claim 6, wherein the second transformer determines the colorant space values using tetrahedral interpolation.

10. The device of claim 9, further comprising a smoother to smooth discontinuities resulting from the tetrahedral interpolation on at least one tetrahedral face.

* * * * *